March 14, 1950 — A. S. MARTIN — 2,500,423
COLLAPSIBLE COAT HANGER
Filed June 9, 1947
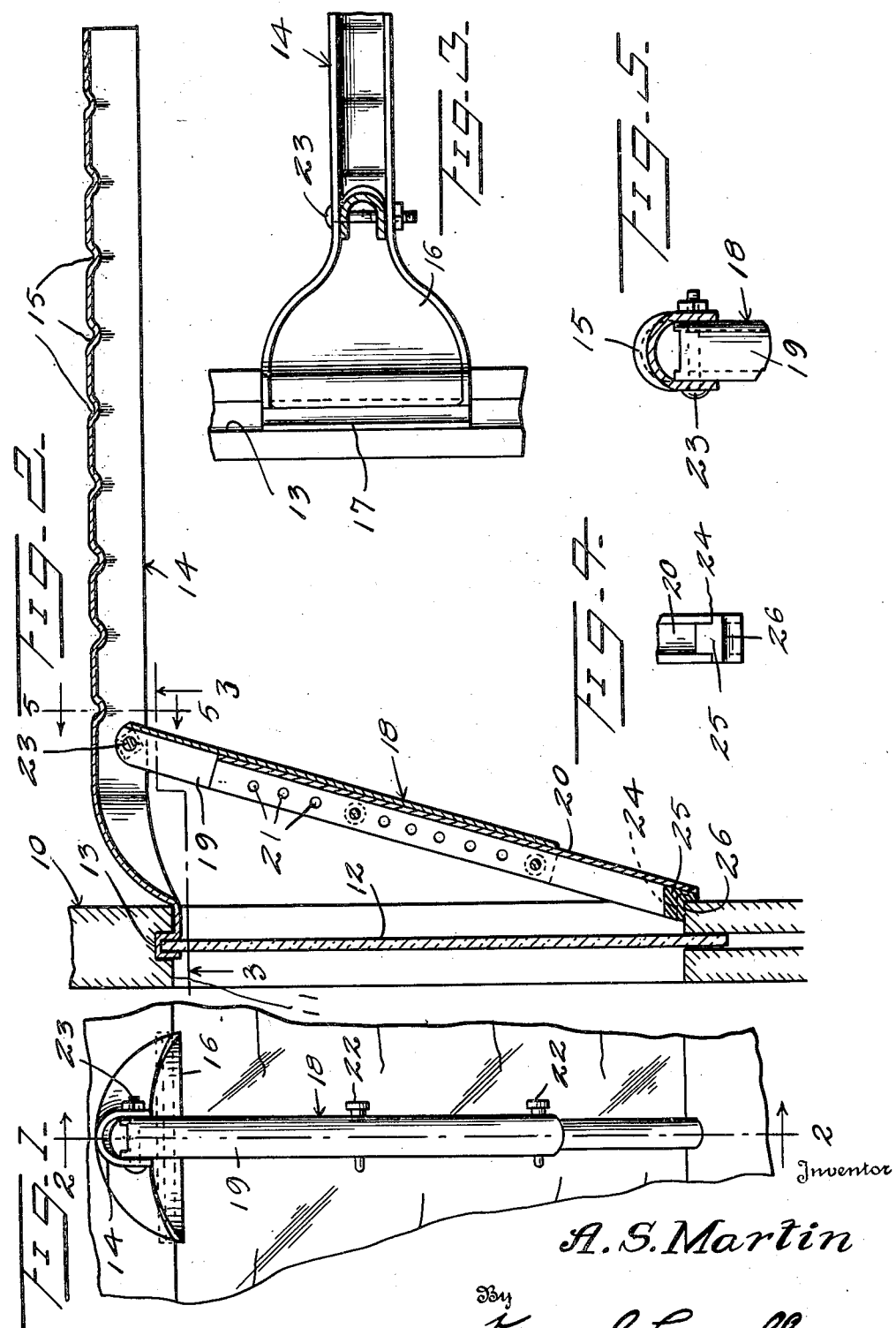
Inventor
A. S. Martin
By Kimmel & Crowell
Attorneys Patented Mar. 14, 1950

2,500,423

UNITED STATES PATENT OFFICE 2,500,423

COLLAPSIBLE COAT HANGER

Albert S. Martin, Quanah, Tex.

Application June 9, 1947, Serial No. 753,589

3 Claims. (Cl. 224—42.45)

This invention relates to a collapsible and detachable supporting bracket for vehicles.

An object of this invention is to provide an improved bracket which is adapted to be detachably mounted in a window opening of a vehicle for supporting articles within the vehicle.

Another object of this invention is to provide a bracket or hanger of this kind which will be locked in operative position by raising of the window.

A further object of this invention is to provide a bracket or hanger of this kind which includes an extensible brace so that the hanger arm may be adjusted to a substantially horizontal position.

A further object of this invention is to provide a bracket or hanger wherein the hanger arm is formed of inverted U-shape and flared out at its outer end to form a relatively wide anchoring part which is bent in channel shape at right angles to the length of the arm for receiving the upper edge of the raised window so that the bracket arm will be firmly secured against horizontal swinging.

A further object of this invention is to provide a bracket of this kind which can be easily and quickly adapted to various types of vehicles.

With the above and other objects in view, my invention consists in the arrangement, combination and details of construction disclosed in the drawing and specification, and then more particularly pointed out in the appended claims.

In the drawing,

Figure 1 is a detail inner end elevation of a bracket or hanger constructed according to an embodiment of this invention, Figure 2 is a sectional view taken on the line 2—2 of Figure 1, Figure 3 is a fragmentary sectional view taken on the line 3—3 of Figure 2, Figure 4 is a fragmentary side elevation of the lower portion of the brace, Figure 5 is a fragmentary sectional view taken on the line 5—5 of Figure 2.

Referring to the drawing, the numeral 10 designates generally the side of a vehicle which is formed with a window opening 11 within which a transparent panel 12 is adapted to move vertically. The opening 11 on the upper edge thereof is formed with a channel 13 within which the upper edge of the panel 12 is adapted to engage when the panel is in raised position.

An elongated bracket arm generally designated as 14 is adapted to be detachably engaged with the upper edge of the window opening 11 and to extend inwardly into the body of the vehicle.

The bracket arm 14 is formed of an inverted U-shaped member having a plurality of transversely extending slots or detents 15 in the bight thereof which are adapted to provide seats for garment hangers or the like in order to hold the garment hangers against sliding movement endwise of the arm 14.

The outer end of the arm 14 is flared outwardly as indicated at 16 and is then formed with a transversely disposed and inverted U-shaped locking member 17 which is adapted to engage in the channel or groove 13. The panel 12 is adapted to engage within the inverted U-shaped member 17 which constitutes an anchoring member so that the outer end of the arm 14 will be firmly locked relative to the window opening.

The bracket arm 14 is adapted to be extended in substantially a horizontal position by means of an extensible bracing member generally designated as 18. The bracing member 18 includes a pair of U-shaped members 19 and 20 disposed in telescoping relation and formed with a plurality of spaced holes 21 through selected pairs of which securing pins 22 are adapted to engage.

The channel member 19 is the upper channel member and is pivoted on a pivot 23 extending between the depending sides of the bracket arm 14 adjacent the outer end portion thereof. The channel member 20 is the lower channel member and is formed with a cut-out 24 at its lower end within which a cushion member or foot 25 is adapted to be firmly secured.

The cut-out 24 is of substantially L-shape and is adapted to engage on the shoulder 26 at the lower edge of the opening 11 and on the inner side thereof.

In the use of this device, the arm 14 is secured in the upper edge of the window opening, first lowering the panel 12 so that the anchoring member 17 may be extended into the groove or channel 13. The panel 12 is then raised so that the upper edge thereof will engage in the anchoring member 17. The extensible brace 18 is adjusted as to length so that the lower end thereof will engage the lower inner corner of the window opening in order to dispose the arm 14 in substantially a horizontal position.

By providing the widened outer anchoring end of the bracket arm 14, the anchoring member 17 will hold the arm 14 against horizontal swinging movement when the panel 12 is in its raised position. Coat hangers or the like may be mounted on the bracket arm 14, being engaged in the detents 15 so that the coat hangers will not shift lengthwise of the arm 14.

I do not mean to confine myself to the exact details of construction disclosed, but claim all variations falling within the purview of the appended claims.

What I claim is:

1. A collapsible garment hanger bracket for mounting in a vehicle window frame having a downwardly opening channel along the upper edge within which a vertically slidable glass panel is adapted to engage, said bracket comprising an elongated horizontally extending inverted U-shaped arm, a plurality of spaced transverse hanger receiving grooves formed in said arm, a flared flattened outer end on said arm bent upon itself to form an inverted U-shaped anchoring member transversely of the length of said arm and adapted to engage within said channeled frame and to receive the upper edge of said glass panel, a bracing bar pivotally secured within said arm adjacent the outer end thereof whereby said outer end will be urged upwardly into said channelled frame by the weight of said arm disposed inwardly of said bracing bar, said bar formed of a pair of telescopic lengthwise adjustable U-shaped members, means securing said members together in selected lengthwise adjusted position, and a cushion member carried by one of said telescopic members engageable with the lower edge of said frame for holding said arm in substantially horizontal position.

2. A collapsible garment hanger bracket for mounting in a vehicle window frame having a downwardly opening channel along the upper edge within which a vertically slidable glass panel is adapted to engage; said bracket comprising an elongated horizontally extending arm having depending flanges formed along the side edges thereof, a plurality of spaced transverse hanger receiving grooves formed in the top surface of said arm, a flattened flared outer end on said arm bent upon itself to form an inverted U-shaped anchoring member disposed transversely of the length of said arm and adapted to engage within said frame channel and to receive the upper edge of said glass panel, a bracing bar having one end pivotally secured within said depending flanges of said arm adjacent the outer end thereof whereby said outer end will be urged into said downwardly opening channel by weight suspended from said arm, said bar being formed of a pair of lengthwise adjustable telescopic members, means engaging through said telescopic members securing said telescopic members in selected adjusted position, and a cushion member carried by one of said telescopic members engageable with the lower portion of said frame for supporting said arm.

3. A collapsible garment hanger bracket as set forth in claim 2 wherein said telescopic members are formed of outwardly opening U-shaped sections, the lowermost of said telescopic members being formed with downwardly and rearwardly opening notches in the sides thereof, and said cushion member being formed with a reduced portion extending into said lowermost member and a frame engaging portion extending into said notches.

ALBERT S. MARTIN.

REFERENCES CITED

The following references are of record in the file of this patent:

UNITED STATES PATENTS

| Number | Name | Date |
|---|---|---|
| 1,185,525 | Morris | May 30, 1916 |
| 1,970,962 | Hinkley | Aug. 21, 1934 |
| 2,344,339 | Zeald | Mar. 24, 1944 |
| 2,398,748 | Lange et al. | Apr. 16, 1946 |
| 2,461,722 | Coons | Feb. 15, 1949 |